United States Patent
Lee et al.

(10) Patent No.: US 7,751,410 B2
(45) Date of Patent: Jul. 6, 2010

(54) APPARATUS AND METHOD FOR MANAGING TRAFFIC USING VID IN EPON

(75) Inventors: Hoon Lee, Daejeon (KR); Tae Whan Yoo, Daejeon (KR); Jung Hak Kim, Daejeon (KR); Yool Kwon, Daejeon (KR); Bong Tae Kim, Daejeon (KR)

(73) Assignee: Electronics and Telecommunications Research Institute (KR)

( * ) Notice: Subject to any disclaimer, the term of this patent is extended or adjusted under 35 U.S.C. 154(b) by 785 days.

(21) Appl. No.: 11/635,774

(22) Filed: Dec. 7, 2006

(65) Prior Publication Data

US 2007/0133549 A1   Jun. 14, 2007

(30) Foreign Application Priority Data

Dec. 8, 2005  (KR)  ............... 10-2005-0119917
Jul. 28, 2006  (KR)  ............... 10-2006-0071527

(51) Int. Cl.
    *H04L 12/46*  (2006.01)
(52) U.S. Cl. .................. 370/395.53; 370/401; 370/469
(58) Field of Classification Search ............... 370/252, 370/360, 395.5, 395.53, 400, 401, 419, 420, 370/463, 365, 469; 709/240
    See application file for complete search history.

(56) References Cited

U.S. PATENT DOCUMENTS

| 6,091,725 | A   | 7/2000  | Cheriton et al. |
| 6,286,052 | B1  | 9/2001  | McCloghrie et al. |
| 6,930,978 | B2  | 8/2005  | Sharp et al. |
| 7,379,676 | B2* | 5/2008  | Kang et al. ............ 398/168 |
| 7,394,824 | B2* | 7/2008  | Hane .................... 370/437 |
| 7,492,768 | B2* | 2/2009  | Yoon et al. ............ 370/392 |
| 7,505,459 | B2* | 3/2009  | Boyd .................... 370/389 |
| 2003/0137975 | A1 |  7/2003 | Song et al. |
| 2004/0264961 | A1 | 12/2004 | Nam et al. |

\* cited by examiner

*Primary Examiner*—Pankaj Kumar
*Assistant Examiner*—Duc T Duong
(74) *Attorney, Agent, or Firm*—Blakely, Sokoloff, Taylor & Zafman

(57) ABSTRACT

An apparatus and method for managing traffic using a VID in EPON are provided. The apparatus includes a MAC lookup table, a service classification policy table, a service control policy table, a MAC lookup unit, a first and second classification module, a VID learning unit and a first and second service control module. The apparatus classifies all packets of up/downlink transmission flow using a VID into a VID unit, through the first and second classification modules and manages traffic thereof according to the parameters thereof through the first and second service control modules. Accordingly, a large amount of traffic for numerous subscribers and services thereof, which was cannot be processed by the limitation on embodying a typical switch or router, can be processed according to the present invention.

15 Claims, 9 Drawing Sheets

| UP/DN | Entry pointer | Service parameter | | | | | | Class pointer | | | |
|---|---|---|---|---|---|---|---|---|---|---|---|
| | | C-VLAN Class. | EMAC AD | IP AD | TCP/ UDP | DSCP/ ToS/TC | 802.1p | 1 (default) | 2 | 3 | 4 |
| UP | 0 | | | | | | | Pointer | Pointer | Pointer | Pointer |
| | 255 | | | | | | | Pointer | Pointer | Pointer | Pointer |
| DN | 0 | | | | | | | Pointer | Pointer | Pointer | Pointer |
| | 255 | | | | | | | Pointer | Pointer | Pointer | Pointer |
| Size (bit) | 8 | 1 | 1 | 1 | 1 | 1 | 1 | 8 | 8 | 8 | 8 |

512 Entries

FIG. 3

| UP/DN | Class pointer | Priority policy ||||| VLAN policy ||||
|---|---|---|---|---|---|---|---|---|---|
| | | Class/DCSP | 802.1p marking | 802.1p remarking | Class priority | 802.1D | 802.1Q | 802.1ad | Class VID |
| UP | 0 | | | | | | | | |
| | 255 | | | | | | | | |
| DN | 0 | | | | | | | | |
| | 255 | | | | | | | | |
| Size (bit) | 8 | 1 | 1 | 1 | 1 | 3 | 1 | 1 | 12 |

512 Entries

FIG. 4

| UP/DN | Class pointer | Bandwidth limiting ||
|---|---|---|---|
| | | GBW | CBW (TW) |
| UP | 0 | 64kb/s | |
| | | | |
| | 255 | 64kb/s | |
| DN | 0 | 64kb/s | |
| | | | |
| | 255 | 64kb/s | |
| Size (bit) | | 16 | 27 |

512 Entries

FIG. 5

| UP/DN | User pointer | Bandwidth limiting | | | |
|---|---|---|---|---|---|
| | | GT | TW | MBW | CBW (TL) |
| UP | 0 | | | 64kb/s | |
| | | | | | |
| | 63 | | | 64kb/s | |
| DN | 0 | | | 64kb/s | |
| | | | | | |
| | 63 | | | 64kb/s | |
| Size (bit) | | 14 | 10 | 16 | 27 |

128 Entries

FIG. 6

| Destination MAC Address | Destination MAC Address | Length/Type | DATA | FCS |

FIG. 8

APPARATUS AND METHOD FOR MANAGING TRAFFIC USING VID IN EPON

CLAIM OF PRIORITY

This application claims the benefit of Korean Patent Application No. 2005-119917 filed Dec. 8, 2005, and Korean Patent Application No. 2006-71527 filed on Jul. 28, 2006, in the Korean Intellectual Property Office, the disclosure of which is incorporated herein by reference.

BACKGROUND OF THE INVENTION

1. Field of the Invention

The present invention relates to an Ethernet passive optical network (EPON), more particularly, to an apparatus and method for managing traffic according to subscribers, subscriber's services, and services using VLAN identification (VID) in EPON.

2. Description of the Related Art

As the next generation of an access network technology for providing fiber to the home (FTTH) and a communication and broadcasting merged service, a passive optical network (PON) technology was introduced. According to the PON technology, it can advantageously provide a broadband service that can accommodate voice, data and broadcasting in an access network, which was indicated as a bottleneck region. Therefore, it expects that the PON technology will be widely used for constructing a digital home. Relatively, 802.3ah EFM (Ethernet in the First Mile) study group was organized under a Working Group of IEEE 802 LAN/MAN standard committee, and defines EPON standard. Recently, the EFM defines an access network technology that uses three wired lines, for example, a Point-to-Point copper line, a Point-to-Point optical cable, a Point-To-Multipoint optical cable. The goals of EPON, which is the Point-to-Multipoint optical cable transmission technology, are 1 Giga-bit transmission speed, 1:16, and 10/20 Km transmission. The EPON is a shared-type optical access network that dose not require active elements such as a repeater and an amplifier of external device, minimizes the optical cable, and reduces the number of optical ports in a central office, thereby allowing affordable management. The EPON is one type of PON based on Ethernet technology.

In a conventional Ethernet protocol, a shared media connection and a point-to-point connection are only considered. On the contrary, in the EPON, a tree structure of distributed topology is formed by connecting a plurality of optical network units (ONU) or optical network terminals (ONT) to single optical link termination (OLT) based on a TDMA scheme. The ONT can be distinguished from the ONU in a view of providing a mean of directly connecting a service application terminal of a user. However, the function of the ONT is identical to that of ONU in the EPON. In the present invention, the ONU and the ONT are not distinguished. The ONU and the ONT can provide interfaces for connecting various application devices.

The EFM introduces a multi-point control protocol (MPCP) that controls the EPON in a MAC control layer.

In downlink channel, EPON always transfers Ethernet frames transmitted from an OLT to all of ONUs through a splitter. On the contrary, only OLT receives frames transmitted from one ONU in the uplink channel. Therefore, other ONUs cannot be aware of the uplink frames. That is, a problem is arisen because the EPON structure does not have a LAN characteristic using a shared medium. Accordingly, the MPCP provides a point-to-point emulation function from an ONU to other ONUs and a point-to-point communication function from an OLT to an ONU using a logical link identifier (LLID). The LLID can be allocated one or more than two for each ONU.

A time division multiple access (TDMA) is provided for an uplink channel. When an ONU transmits an Ethernet frame to an OLT, a collision of traffic may occur because a plurality of ONUs can transmit frames at the same time. In order to avoid such a collision, the MPCP provides a method of sharing the uplink channel through the TDMA.

Topological downlink traffic in the EPON can be listened by other ONUs. Also, the resource of uplink traffic can be accessed by unauthorized ONUs. Since the confidentiality of information must be provided to a subscriber and a protection service of contents and a billing service must to be provided to a service provider, the EPON must guarantee the integrity of subscriber traffic, and must block the access of unauthorized device and subscriber.

It is very important issue to manage subscriber traffic in a communication field. Many related technologies have been introduced. In general, data traffic is classified based on a given profiles according to a management purpose, and a policy is performed using the result of classification. The classification and the policy are generally performed in a L2 switch or a L3 router. Also, the packet header is inspected for the data packet classification and a matching condition is found. If a packet having a given condition is found, it is processed according to a given policing rule. A rule table stores rules according to the conditions. Generally, the switch and router manages server tens to hundreds rule tables.

FIG. 1 is a block diagram illustrating a point-to-multi-point mode EPON system according to the related art.

Referring to FIG. 1, in the EPON system, one optical link terminal (OLT) is connected to a plurality of ONUs through a splitter in a point-to-multipoint structure. A downlink transmission from the OLT to the ONU/ONTs and an uplink transmission from the ONU/ONTs to the OLT are performed based on a single transmission module that uses different wavelengths.

In order to control traffic from a switch of an OLT to subscriber devices connected to each port of ONU/OLT in the point-to-multipoint EPON, the switch of the OLT must provide a corresponding policy according to a subscriber, and a subscriber service, and a method of classifying traffic to provide the policy.

It is common to use a VID for classifying a subscriber and a subscriber service in an OLT upper layer which is a link termination device when a L2 switch or a L3 router is used in the EOPN. In this case, no method is provided for classifying subscribers connected to each ONU and a service thereof at the same time and managing them. Also, it is very difficult to manage traffic from the router to the devices connected to a plurality of ONUs due to a VID number limitation, in which the VIS number is limited to 4096.

If there are numerous subscribers and services thereof in the EPON, it is impossible to manage the traffic thereof due to the limitation of the rule table provided in the switch or the router. Therefore, it requires an additional apparatus for managing traffic from the switch or the router having insufficient classification and policy tables to an OLT MAC in order to simultaneously manage the subscriber and the service thereof.

As a related conventional technology, a traffic management apparatus for processing traffic according to a predetermine rule without using additional rule tables was introduced in U.S. Pat. No. 6,930,978. The traffic management apparatus measures the input data traffic. If the measured input data traffic is higher than a predetermined threshold value, the traffic management apparatus drops the input data traffic. On the contrary, if not, the traffic management apparatus transfers the input data traffic to a system. As described above, the traffic management apparatus can guarantee the smooth operation of the system by providing data to the system not to exceed the threshold value. However, the traffic management apparatus cannot variously and effectively manage traffic.

As another related conventional technology, a switch for controlling a rule table in real time using a CPU was introduced in U.S. Pat. No. 6,091,725. Although the switch can manage traffic in a flow unit by dynamically processing input data using the CPU and a switch, the high speed operation is impossible because of using the CPU.

As further another related conventional technology, an apparatus for integrally managing all policies through an additional policy service in a network without using a rule table was introduced in U.S. Pat. No. 6,286,052. The apparatus allows a network manager to integrally control data flows by distributing policy servers and flow information components and exchanging information using flow management sessions. However, it is impossible to variously and effectively manage the traffic according to subscriber and services thereof.

SUMMARY OF THE INVENTION

The present invention has been made to solve the foregoing problems of the prior art and it is therefore an object of certain embodiments of the present invention to provide an apparatus and method for managing various traffics according to a subscriber, a subscriber service and a service using a VID between a switch in an OLT and a MAC in EPON.

According to an aspect of the present invention, there is provided an apparatus for managing traffic using a VID of an Ethernet passive optical network (EPON), including: a MAC (media access control) lookup table for matching VIDs to be used in an EPON according to a MAC address and managing them; a service classification policy table for storing a service classification reference according to a service control parameter per a VID; a service control policy table for storing a service policy to be provided according to a service classified in the service classification policy table; a MAC lookup unit for looking up a VID corresponding to a MAC address of a downlink packet with reference to the MAC lookup table if the downlink packet inputs; a first service classification module for classifying a VID service class of the downlink packet with reference to the service classification policy table based on the looked-up VID from the MAC lookup unit; a VID learning unit for learning a VID through a packet frame of an uplink packet and updating the MAC lookup table; a second service classification module for classifying a VID service class of an uplink packet with reference to the service classification policy table; and a second service control module for requesting a service according to the classified VID service class from the second service classification module in an uplink transmission flow.

According to another aspect of the present invention, there is provided a method for managing traffic using a VID of an EPON (Ethernet passive optical network) that manages traffic of an uplink/downlink transmission flow between a switch of an OLT (optical link termination) and a MAC (media access control), including the steps of: a) setting a MAC (media access control) lookup table for matching VIDs to be used in an EPON according to a MAC address and managing them, a service classification policy table for storing a service classification reference according to a service control parameter per a VID, and a service control policy table for storing a service policy to be provided according to a service classified in the service classification policy table; b) searching an allocated VID by looking up the MAC lookup table based on a MAC address of an input packet; c) classifying a service class corresponding to a searched VID with reference to the service classification policy table; and d) controlling a service of the input packet by finding a service control policy corresponding to the classified service class with reference to the service control policy table.

It is to be understood that both the foregoing general description and the following detailed description of the present invention are exemplary and explanatory and are intended to provide further explanation of the invention as claimed.

BRIEF DESCRIPTION OF THE DRAWINGS

The above and other objects, features and other advantages of the present invention will be more clearly understood from the following detailed description taken in conjunction with the accompanying drawings, in which:

FIG. 3 is a block diagram illustrating a service classification policy table for classifying traffic by a service according to an embodiment of the present invention;

FIG. 4 is a block diagram illustrating a service control policy table for controlling a classified traffic by a service according to an embodiment of the present invention;

FIG. 5 is a block diagram illustrating a service control policy table for controlling a classified traffic by a service according to another embodiment of the present invention;

FIG. 6 is a block diagram illustrating a service control policy table for controlling a bandwidth by a subscriber;

FIG. 8 is a block diagram illustrating a structure of a traffic managed packet according to an embodiment of the present invention.

DETAILED DESCRIPTION OF THE PREFERRED EMBODIMENT

The present invention will now be described more fully hereinafter with reference to the accompanying drawings, in which preferred embodiments of the invention are shown.

Figure 1:
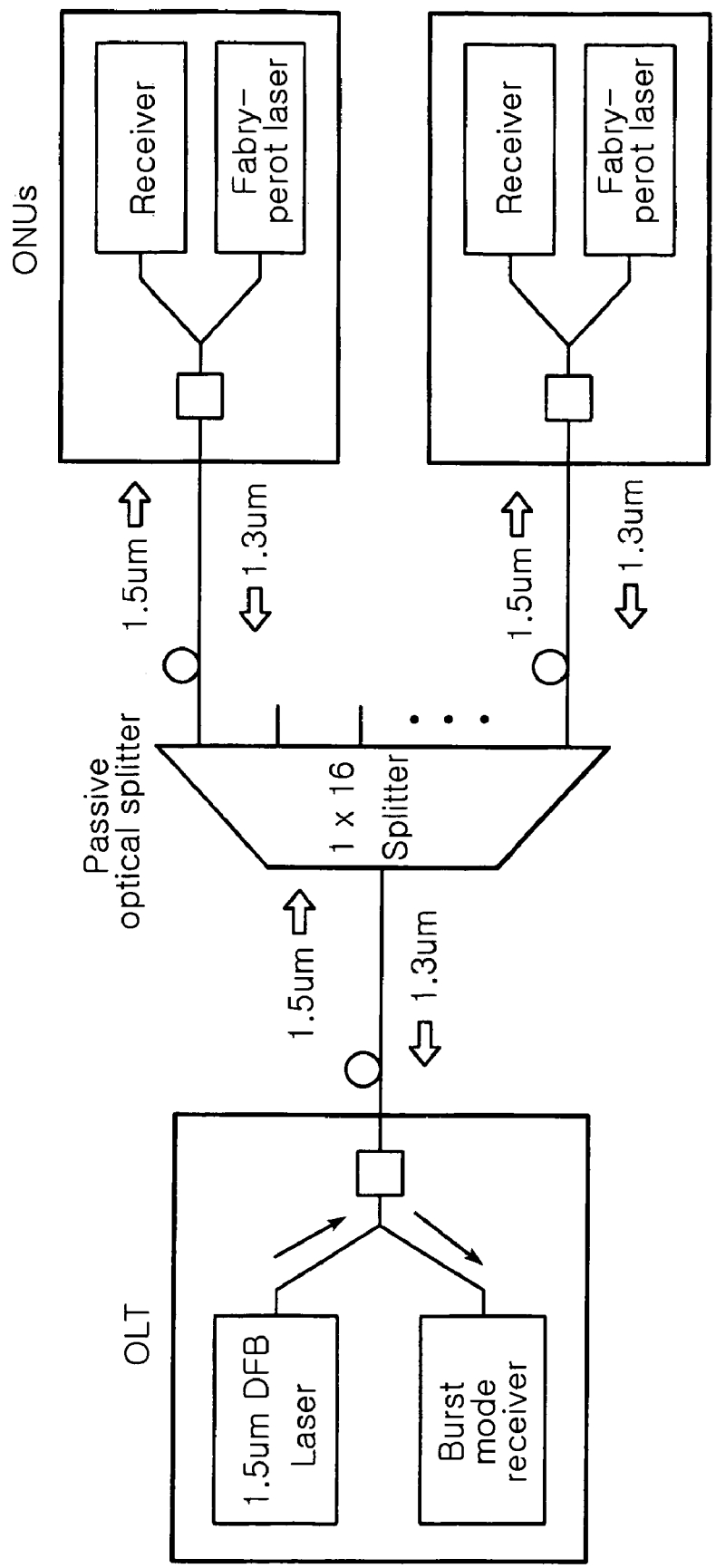
FIG. 1 is a block diagram illustrating a point-to-multi-point mode EPON system according to the related art.
Figure 2:
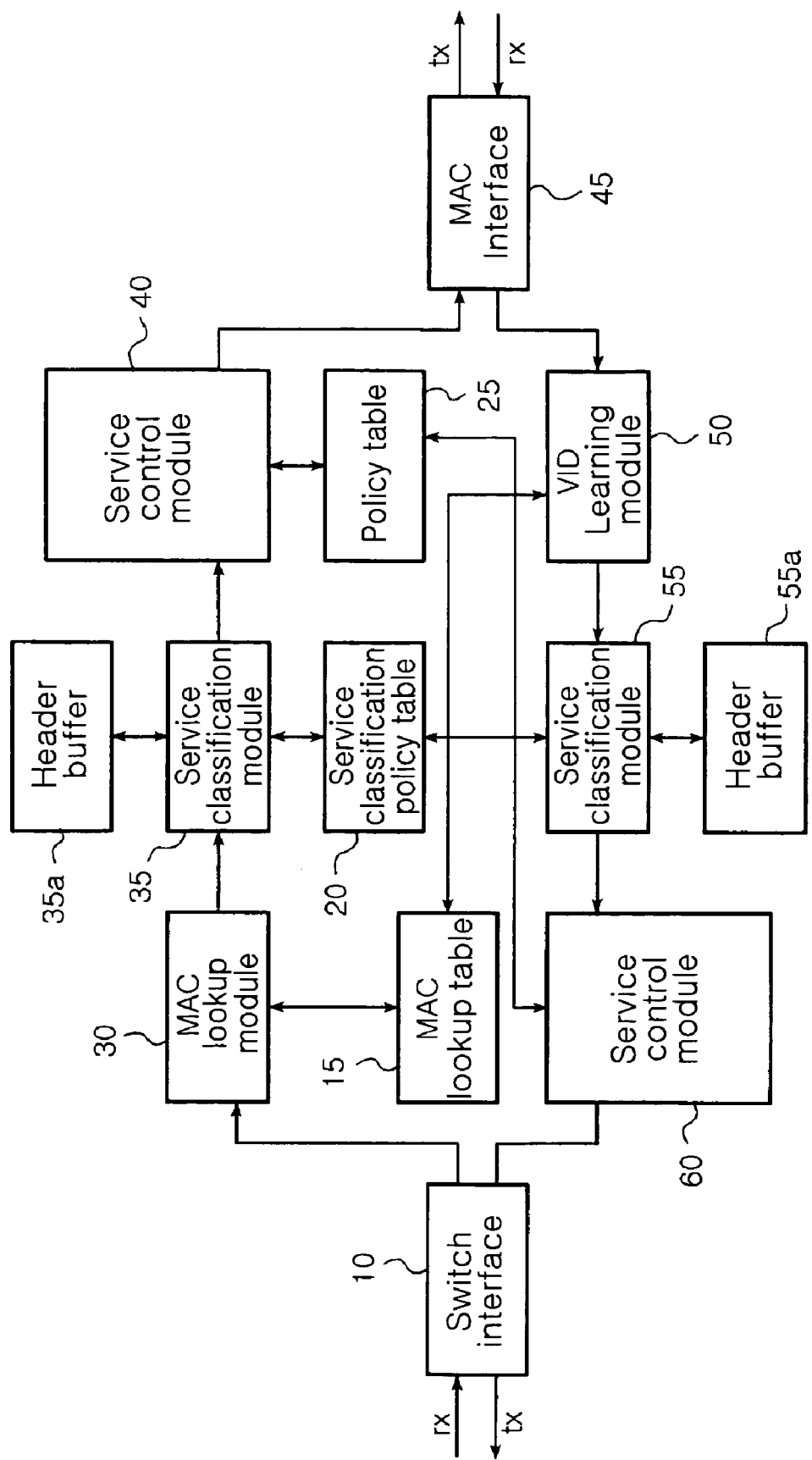
FIG. 2 is a block diagram illustrating an apparatus for managing traffics using a VID of an EPON according to an embodiment of the present invention.

FIG. 2 is a block diagram illustrating an apparatus for managing traffics using a VID according to an embodiment of the present invention.

Referring to FIG. 2, the apparatus for managing traffics using a VID according to the present embodiment includes a MAC lookup table 15, a service classification policy table 20, a service control policy table 25, a MAC lookup module 30, a first service classification module 35, a first service control module 40, a VID learning module 50, a second service classification module 55, and a second service control module 60. The MAC lookup table 15 stores a VLAN identification (VID) of an uplink/downlink transmission flow related to a corresponding addresses per each MAC address. The service classification policy table 20 stores a service classification policy which is a reference to classify service classes of uplink/downlink transmission flows per each VID. The service control policy table 25 stores a service control policy of each service class classified at the service classification policy table 20. The MAC lookup module 30 searches a VID of a corresponding uplink transmission flow corresponding to the MAC address by looking up the MAC lookup data 15 using a destination MAC address of a downlink packet. The first service classification module 35 classifies the downlink packet by a service class with reference to the service classification policy table 20 based on a service parameter obtained from a header of an input downlink packet and the looked up VID from the MAC lookup module 30 when the uplink transmission flow. The first service control module 40 obtains a service policy corresponding to the service class classified in the first service classification module 35 when the downlink transmission flow, and controls a service of a downlink according to the obtained service policy. The VID learning module 50 updates the MAC lookup table 15 by looking up a VID according to a MAC address through a packet frame of an uplink packet. The second service classification module 55 classifies a service class of a corresponding uplink transmission flow based on the header information of a corresponding uplink packet and the VID of a corresponding uplink packet in the uplink transmission flow. The second service control module 60 controls a service for a corresponding uplink packet according to a classified service class in the second service classification module 55 in the uplink transmission flow.

The traffic managing apparatus further includes a first buffer 55a and a second buffer 55 for storing and providing corresponding downlink and uplink packet header information required in service classification of the first and second service classification modules 35 and 55.

The traffic managing apparatus is disposed between a switch in an OLT and a MAC in EPON, and manages traffic by controlling services for uplink/downlink transmission flows independently from the MAC or the switch. Accordingly, the traffic managing apparatus includes a switch interface module 10 and a MAC interface module 45. The switch interface module 10 inputs and outputs the uplink/downlink packet-by cooperating with the switch of the OLT, and the MAC interface module 45 inputs and outputs the uplink/downlink packet by cooperating with the OLT MAC.

The MAC lookup module 30 searches a VID of a packet having a corresponding destination MAC address through looking up a MAC address stored in the MAC lookup table 15 for an uplink packet to be transmitted to ONU/OLT in EPON.

The learning of VID stored in the MAC lookup table 15 is achieved from the relation between a VID and a source MAC address from the uplink packet. Such a learning of VID is performed in the VID learning module 50 disposed in a side that process an uplink transmission flow.

The MAC lookup table 15 performs operations as follows when the MAC lookup table 15 receives a downlink packet from a switch interface module 10 and the downlink packet includes a VID. If a VID of a predetermined MAC address is present in the MAC lookup table, the MAC lookup table 15 changes the VID of the input downlink packet to a looked-up VID from the MAC lookup table. If the VID of predetermined MAC address is not present in the MAC lookup table, the VID of the input downlink packet is sustained. On the contrary, if the input downlink packet does not include the VID and the corresponding VID is not present in the MAC lookup table, the MAC lookup table 15 attaches a default VID to the input downlink packet.

The first and second service classification modules 35 and 55 classify a service class of a transmission flow according to a same classification policy stored in the service classification policy table 20, thereby providing constant services to a same subscriber and a same service in an uplink and downlink transmission.

In more detail, the service classification policy table 20 stores service classification policies depending on service control parameters of L2, L3 and L4 per each VID, such as L2 MAC source address and destination address, 802.1p priority information, L3 ToS, DSCP and L4 TCP/UDP source port and destination port. The service classification policy table 20 also stores service classification polices according to whether 802.1ad C-VLAN, or S-VLAN is applied or not.

Referring to Table in FIG. 3, an entry denotes a VID. The Table provides 256 entries for each of the uplink and downlink. The bit of each entry denotes whether each service control parameter is activated or not. The Table further includes a class pointer that denotes an address value of the service control policy table 25 corresponding to a service class obtained as the final result of service classification per each entry.

The first and second service classification modules 35 and 55 classify the service class of the input packet with reference to the service classification policy table 20. The first and second service classification modules 35 and 55 performs the service classification using the corresponding service control parameter according to whether each service control bit of an entry of a VID of a corresponding packet is activated or not. After classification, the first and second service classification modules 35 and 55 obtain one level value among set levels.

Figure 9:
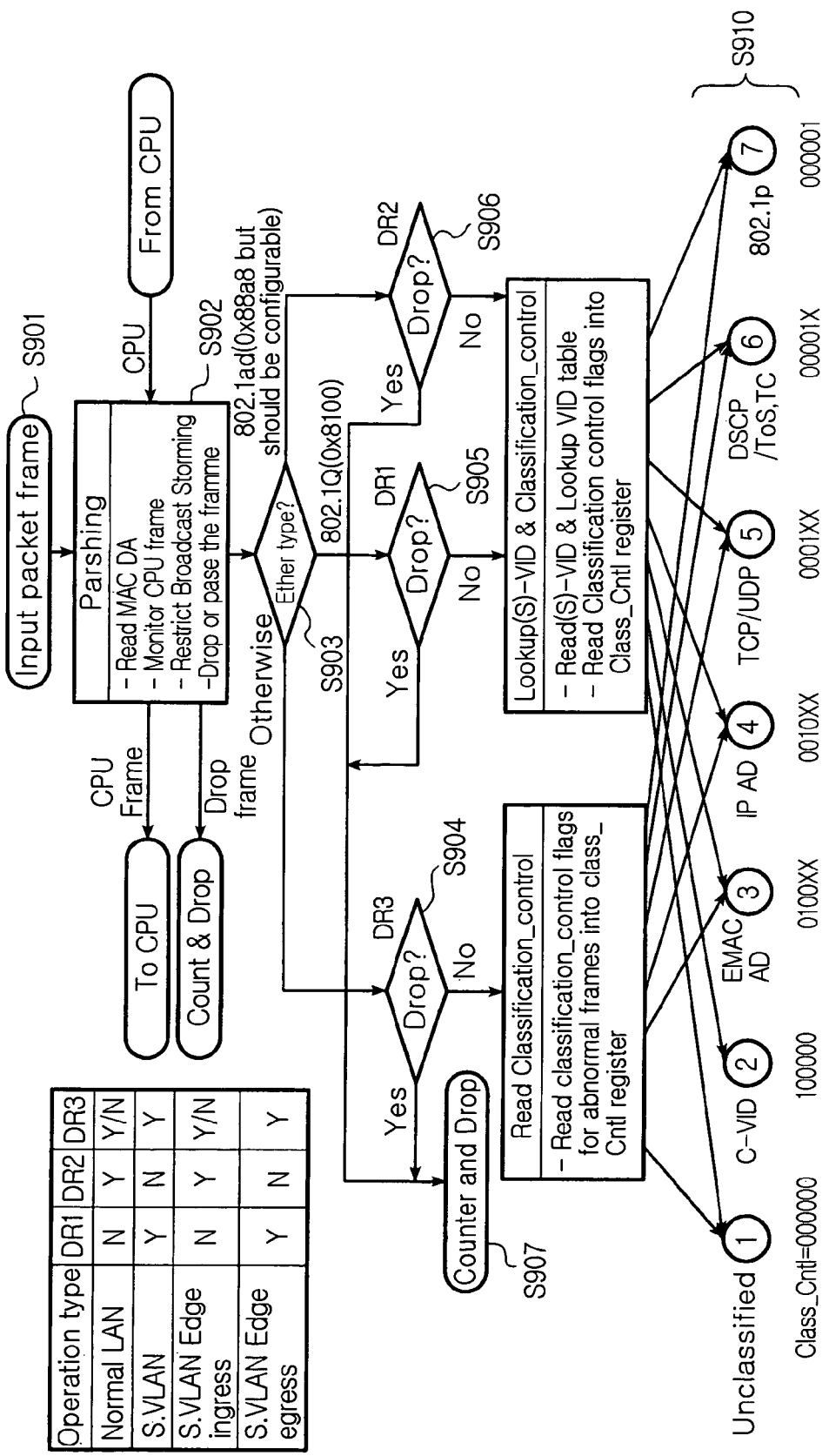
FIG. 9 is a flowchart illustrating a method for classifying a service based on a VID.

The service class classification operation by the first and second service classification modules 35 and 55 is shown in FIG. 9 in detail, and will be described in later.

Afterward, the first and second service control modules 40 and 60 control services according to a service class classified according to the uplink and downlink packet. That is, the first and second service control modules 40 and 60 perform a rate limiting operation for controlling a bandwidth, a 802.1p priority marking/re-marking operation for controlling priorities, a 802.1Q, 802.1ad VAN tagging/detagging operation, and a shaping operation for each uplink/downlink transmission flow according to the classified service class. Herein, each control value is obtained with reference to parameters in the service control policy table 25.

For example, if a predetermined class point value of the service policy table 25 is assigned for the uplink or downlink flow by the first and second service classification modules 35 and 55, the first and second service modules 40 and 60 control the bandwidth and priority of a corresponding flow using the control value described in the corresponding class pointer.

FIGS. 4 and 5 show the service policy table 25 according to an embodiment of the present invention.

Referring to FIGS. 4 and 5, the entry in the service policy table 25 denotes a service class, and is indicated by the class point. Each entry describes a service control policy applied to a corresponding service class. For example, a priority policy and a VLAN policy are described as shown in FIG. 4, or a bandwidth policy per a service class is described as shown in FIG. 5.

Therefore, the first and second service control modules 40 and 60 control the priority and/or the bandwidth of a corresponding flow using a bandwidth control value or a priority control value, which is indicated by a class pointer value assigned by the first and second service classification modules 35 and 55.

Furthermore, the service policy table 25, as shown in FIG. 6, can include a bandwidth limiting policy according to a user. Herein, the user may be classified using a relation between a MAC address and a LLID from an OLT MAC.

The VID learning module 50 learns a source MAC address and a VID from an input uplink packet, and updates the MAC lookup table 15. Furthermore, the VID learning module 50 can allocate an independent VID to a subscriber or a subscriber's service device based on a LLID allocated to an ONU/ONT from the MAC of an OLT, additionally.

In general, an EPON system has a TDMA based point-to-multipoint structure, and allocates one or a plurality of LLIDs to each ONU in order to identify an ONU by an OLT. However, a switch cannot be aware of such information about the LLID because the LLID is terminated at the OLT. Therefore, the traffic managing apparatus according to the present embodiment receives a relation of VID and LLID from an OLT MAC, and manages a service policy table per a subscriber as shown in FIG. 6.

Furthermore, the traffic managing apparatus is disposed between a switch and an OLT MAC and manages traffic. In order to managing the traffic, the traffic managing apparatus includes a switch interface module 10 and a MAC interface module 45. The switch interface module 10 and the MAC interface module 45 support a gigabit media independent interface (GMII) and a reduced GMII (RGMII).

As described above, the traffic managing apparatus according to the present embodiment can manage traffic according to a subscriber, a subscriber's service and a service. Also, the traffic managing apparatus according to the present embodiment can smoothly classify a large amount of services and control them by managing traffic using the service classification policy and the service control policy.

Herein, the traffic managing apparatus according to the present embodiment performs a bandwidth limiting operation at a final step for controlling services according to each subscriber.

Accordingly, the traffic managing apparatus assigns additional VID to a downlink packet toward a predetermined ONU/ONT according to its destination, and manages the traffic according to a policy corresponding to the assigned VID. The packet having a corresponding VID is transferred to a destination ONU/ONT by receiving a predetermined LLID from a MAC.

Furthermore, when a VID of an input packet is transformed to a VID from a lookup table, such a transformation is stored through a table. Such a stored transform information is searched for a packet with a predetermined VID, which inputs from an ONU/ONT, and the VID of input packet is transformed to a corresponding VID and transferred to a network. Therefore, a VID used in an EPON link can be distinguished from a VID used in a network. In other words, an OLT is allowed to control a VID of a packet input from a subscriber in the present embodiment. Therefore, the OLT is allowed to use maximum 4096 VIDs between an ONU connected thereto and a subscriber's device without limiting the number of VIDs in a network.

A method for classifying traffic by VID and providing the classified traffic according to an embodiment of the present invention will be described with reference to accompanying drawings, hereinafter.

Figure 7:
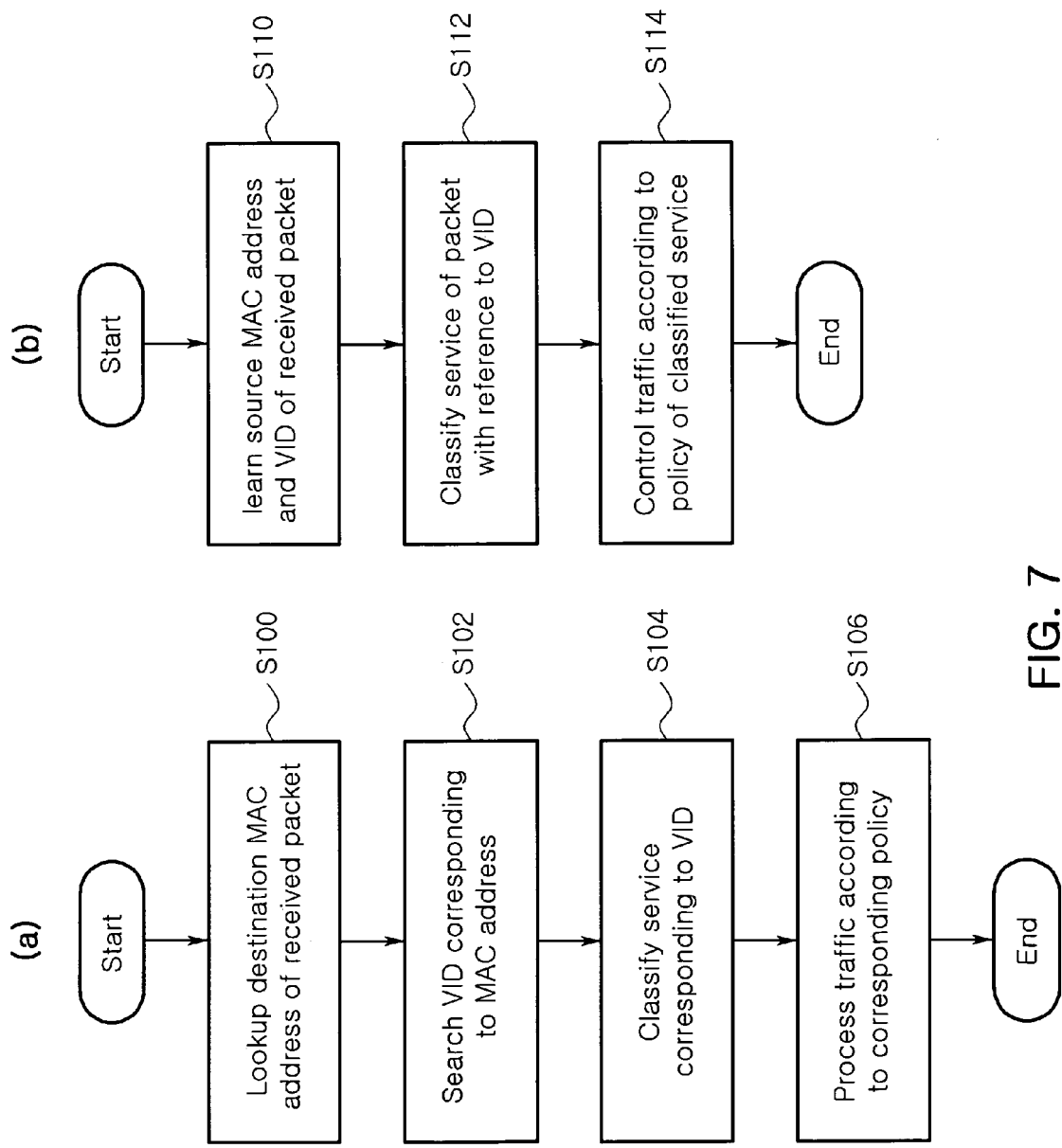
FIG. 7 is a flowchart illustrating a traffic managing method using a VID according to an embodiment of the present invention.

FIG. 7 is a flowchart showing a traffic managing method according to an embodiment of the present invention. In FIG. 7, a flowchart (a) shows a traffic managing method for a downlink transmission flow, and a flowchart (b) shows a traffic managing method for an uplink transmission flow.

Referring to the flowchart (a) in FIG. 7, at step S 100, a destination MAC address of a packet frame is looked up when a downlink packet is received from a switch through a GMII/RGMII interface. At step S102, a corresponding VID is searched from the MAC lookup table 15 and the searched VID is inserted to the received downlink packet. Herein, if a VID corresponding to the MAC address of the input downlink packet is searched from the MAC lookup table 15, it means that there is a VID that can be given to a packet having a corresponding MAC address in an EPON regardless of the current VID of the received downlink packet. If the input downlink packet already has a VID, a destination MAC address of a packet frame is looked up. If the corresponding VID is found from the MAC lookup table 15, the VID in the received downlink packet is replaced with the found VID. If not, the VID in the received downlink packet is sustained.

At step S104, a service class of the received downlink packet is classified according to a service control parameter and/or a user control parameter with reference to the service classification policy table 2O based on the VID in the downlink packet.

At step S106, a service control policy, for example, bandwidth limiting, and priority control, is obtained corresponding to the classified service class with reference to the service control policy table 25, and the service is controlled according to the obtained policy.

The traffic managing method for the uplink transmission flow is very similar to that for the downlink transmission flow, except a step for learning a VID.

Referring to the flowchart (b) of FIG. 7, at step S110, if an uplink packet inputs, a source MAC address and a VID are learned from a header of the uplink packet, and the MAC lookup table is updated.

At step S112, a service class of the input uplink packet is classified according to a service control parameter and/or a user control parameter with reference to the service classification policy table 20 based on the VID of the input uplink packet.

At step S114, a service control policy such as controlling a bandwidth and a priority, is obtained based on the classified service class, and a transmission service is controlled for the uplink packet according to the obtained policy.

FIG. 8 is a diagram illustrating a structure of an uplink/downlink packet frame according to an embodiment of the present invention.

Referring to FIG. 8, a destination MAC address denotes a MAC address of a device in a destination of a data packet, and a source MAC address denotes a MAC address of a device that generates a data packet. Also, a MAC address is used as a mean to identify devices related thereto. Furthermore, a length of corresponding packet and an ether-type can be obtained from the uplink frame.

FIG. 9 is a flowchart illustrating a step for classifying a service class based on the VID, such as the steps S104 and S112, in the traffic managing method according to an embodiment of the present invention.

Referring to FIG. 9, at steps S901 and S902, if a packet frame inputs after looking up the VID thereof, header information (ether type) is obtained by parshing the input packet. At steps S903 to S910, a corresponding service class is classified according to the ether type, a user control parameter and a service control parameter of a corresponding VID.

Herein, the user control parameter denotes a major service classification policy. As shown in a table at left upper portion of FIG. 9, a major policy of a current service classification is given by assigning an operation type by a user.

That is, it determines whether the input packet is dropped or not according to an ether type of the input packet and an operation type from a user at step S904 to S906. If it determines to drop the packet, the input packet is dropped at step S907. If not, at steps S908 and S909, a detail service classification is performed using parameters corresponding to an active control bit according to a service control bit set to a corresponding VID of the service classification policy table 20.

For example, if an input packet is classified to classify a service using an IP address and a TCP/UDP, and if a TCP/UDP control bit is activated in a corresponding VID of the service classification policy table 20, a service classification is continuously performed using a TCP/UDP of the input packet, and one value among four service classes is obtained as a final result.

If the classification of the service class is failed according to the methods of the present embodiment, or if the MAC lookup is failed, the related packets are independently managed as a non-classification packet.

As described above, all packets of up/downlink transmission flow are classified into a VID unit, and the traffic thereof can be managed according to the parameters thereof.

Certain embodiments of the present invention provides a method and apparatus for classifying devices and services of subscribers by user's control, allocating an additional VID and managing traffic in a VID unit. Accordingly, a large amount of traffic for numerous subscribers and services thereof, which was cannot be processed by the limitation on embodying a typical switch or router, can be processed according to the present invention.

While the present invention has been described with reference to the particular illustrative embodiments and the accompanying drawings, it is not to be limited thereto but will be defined by the appended claims. It is to be appreciated that those skilled in the art can substitute, change or modify the embodiments into various forms without departing from the scope and spirit of the present invention.

What is claimed is:

1. An apparatus for managing traffic using a VLAN identification (VID) of an Ethernet passive optical network (EPON), comprising:
    a MAC (media access control) Lookup table for matching VIDs to be used in an EPON according to a MAC address and managing them;
    a service classification policy table for storing a service classification reference according to a service control parameter per a VID;
    a service control policy table for storing a service policy to be provided according to a service classified in the service classification policy table;
    a MAC lookup unit for looking up a VID corresponding to a MAC address of a downlink packet with reference to the MAC lookup table if the downlink packet inputs;
    a first service classification module for classifying a VID service class of the downlink packet with reference to the service classification policy table based on the looked-up VID from the MAC lookup unit;
    a first service control module for providing a service of a downlink transmission flow according to the VID service class classified at the first classification module with reference the service control policy table;
    a VID learning unit for learning a VID through a packet frame of an uplink packet and updating the MAC lookup table;
    a second service classification module for classifying a VID service class of an uplink packet with reference to the service classification policy table; and
    a second service control module for requesting a service according to the classified VID service class from the second service classification module in an uplink transmission flow.

2. The apparatus according to claim 1, further comprising:
    a switch interface for providing an interface to cooperate with a switch of an OLT (optical link termination), transferring a downlink packet inputted from the switch to the MAC lookup unit, and transferring an uplink packet outputted from the second service control module to the switch; and
    a MAC interface for providing an interface to cooperate with a MAC layer of an OLT, transferring a downlink packet outputted from the first service control module to a MAC layer, and transferring an uplink packet from a MAC layer to the VID lookup module.

3. The apparatus according to claim 1, wherein the MAC lookup unit searches a corresponding VID from the MAC lookup table based on a destination MAC address of the downlink packet if an input downlink packet includes a VID, changes the VID of the downlink packet to the searched VID if the corresponding VID is found from the MAC lookup table, or sustains the VID of the downlink packet if the corresponding VID is not found from the MAC lookup table.

4. The apparatus according to claim 3, wherein the MAC lookup unit adds a default VID to the downlink packet if a VID corresponding to a MAC address of a downlink packet inputted from the MAC lookup table.

5. The apparatus according to claim 1, wherein the first and second service classification modules classify a service class of an uplink packet and a downlink packet by looking up the service classification policy table based on the looked up VID according to a user control parameter.

6. The apparatus according to claim 1, wherein the service control parameter of the service classification policy table includes at least one of L2 MAC source and destination addresses, 802.1p priority information, L3 ToS, DSCP and L4 TCP/UDP source and destination ports, and whether or not using 802.1ad C-VLAN and S-VLAN.

7. The apparatus according to claim 1, wherein the service control policy table includes at least one of a bandwidth limiting policy, a priority policy, and a VLAN policy according to a service class.

8. The method according to claim 7, wherein the service control policy table further includes a bandwidth limiting policy classified according to a subscriber based on a LLID (logical link identification) allocated for classifying a plurality of ONUs (optical network units) or a subscriber by an OLT (optical line terminal).

9. A method for managing traffic using a VLAN identification (VID) of an EPON (Ethernet passive optical network) that manages traffic of an uplink/dowulink transmission flow between a switch of an OLT (optical link termination) and a MAC (media access control), comprising the steps of:
    a) setting a MAC (media access control) lookup table for matching VIDs to be used in an EPON according to a MAC address and managing them, a service classification policy table for storing a service classification reference according to a service control parameter per a VID, and a service control policy table for storing a service policy to be provided according to a service classified in the service classification policy table;
    b) searching an allocated VID by looking up the MAC lookup table based on a MAC address of an input packet;

c) classifying a service class corresponding to a searched VID with reference to the service classification policy table; and d) controlling a service of the input packet by finding a service control policy corresponding to the classified service class with reference to the service control policy table.

10. The method according to claim 9, wherein the service control parameter of the service classification policy table includes at least one of L2 MAC source and destination addresses, 802.1p priority information, L3 ToS, DSCP and L4 TCP/UDP source and destination ports, and whether or not using 802.1ad C-VLAN and S-VLAN.

11. The method according to claim 9, wherein the service control policy table includes at least one of a bandwidth limiting policy, a priority policy, and a VLAN policy according to a service class.

12. The method according to claim 9, wherein the service control policy table further includes a bandwidth limiting policy classified according to a subscriber based on a LLID (logical link identification) allocated for classifying a plurality of ONUs (optical network units) or a subscriber by an OLT (optical line terminal).

13. The method according to claim 9, wherein the VID is independently allocated to each subscriber based on a LLID allocated to a plurality of ONU/ONTs, or allocated to a classified service in the service policy table using a service control parameter of a corresponding packet.

14. The method according to claim 9, further comprising the step of e) updating the MAC lookup table by learning a MAC source address and a VID of a packet frame of a corresponding uplink packet for a uplink transmission flow.

15. The method according to claim 9, wherein in the step b), if a downlink packet having a VID inputs, the VID of the downlink packet changes with the searched VID, the changing relation of the VID is stored in a table, and the downlink packet is transmitted with reference to the stored changing relation for an uplink packet after changing the VID.

* * * * *